United States Patent
Huang

(10) Patent No.: US 11,772,947 B1
(45) Date of Patent: Oct. 3, 2023

(54) JACKING MACHINE AND CONTROL METHOD THEREOF

(71) Applicant: Kangjun Huang, Zhongshan (CN)

(72) Inventor: Shouqi Huang, Guilin (CN)

(73) Assignee: Kangjun Huang, Zhongshan (CN)

( * ) Notice: Subject to any disclaimer, the term of this patent is extended or adjusted under 35 U.S.C. 154(b) by 0 days.

(21) Appl. No.: 18/199,968

(22) Filed: May 21, 2023

(30) Foreign Application Priority Data

Mar. 6, 2023 (CN) .......................... 202310209214.9

(51) Int. Cl.
*F16H 25/20* (2006.01)
*B66F 17/00* (2006.01)
*B66F 3/44* (2006.01)
*F16H 25/24* (2006.01)

(52) U.S. Cl.
CPC ................ *B66F 17/00* (2013.01); *B66F 3/44* (2013.01); *F16H 25/20* (2013.01); *F16H 25/2454* (2013.01); *F16H 2025/2081* (2013.01)

(58) Field of Classification Search
CPC .... B66F 17/00; B66F 3/44; F16H 2025/2081; F16H 25/2454; F16H 25/20
USPC ....................................................... 254/103
See application file for complete search history.

(56) References Cited

U.S. PATENT DOCUMENTS

| | | | | |
|---|---|---|---|---|
| 4,137,784 | A * | 2/1979 | Griffin ...................... | B66F 3/44 74/25 |
| 8,495,924 | B2 * | 7/2013 | Fukano ............... | F16H 25/2454 74/89.44 |
| 8,823,229 | B2 * | 9/2014 | Brieschke ............. | F16H 19/025 310/90 |
| 2007/0169578 | A1 * | 7/2007 | Christensen ........ | F16H 25/2021 74/625 |
| 2020/0049241 | A1 * | 2/2020 | Shimizu ................. | H02K 7/116 |
| 2020/0284329 | A1 * | 9/2020 | Soltermann ......... | F16H 25/2454 |
| 2020/0393028 | A1 * | 12/2020 | Mengel .................. | A61G 7/018 |
| 2021/0254690 | A1 * | 8/2021 | Hirano ................ | F16H 25/2204 |
| 2021/0362989 | A1 * | 11/2021 | Su .............................. | B66F 3/20 |
| 2022/0090732 | A1 * | 3/2022 | Chen .......................... | F16B 7/14 |
| 2022/0221035 | A1 * | 7/2022 | Schewe .................. | A61G 7/018 |
| 2022/0242704 | A1 * | 8/2022 | Struck ...................... | B66D 1/06 |
| 2023/0179073 | A1 * | 6/2023 | Lin ........................ | H02K 41/02 310/12.27 |

\* cited by examiner

*Primary Examiner* — Mahdi H Nejad

(74) *Attorney, Agent, or Firm* — Li & Cai Intellectual Property Office

(57) ABSTRACT

A jacking machine includes a main body, a support leg, a ball screw assembly, a power device, a braking device, and a self-locking device. The self-locking device includes: a chainring surrounding and fixedly connected to the screw rod, a toothed claw corresponding to the chainring and rotatably connected to a side of the main body, a first elastic member providing force to the toothed claw, and an electric actuator. A control method thereof includes after receiving a jack-up command, controlling the braking device to leave a braking state, and controlling the toothed claw to switch to a disengaged state, controlling the power device to drive the support leg and the main body to move relatively, and after receiving a stop command, controlling the braking device to enter the braking state, and controlling the toothed claw to switch to an engaged state.

10 Claims, 9 Drawing Sheets

JACKING MACHINE AND CONTROL METHOD THEREOF

FIELD OF THE DISCLOSURE

The present disclosure relates to the technical field of jacking machines based on a ball screw assembly, and more particularly to a jacking machine and a control method thereof.

BACKGROUND OF THE DISCLOSURE

Some existing jacking machines include a main body used to connect an object to be lifted, a support leg that is sleeved with the main body and can move up and down relative to the main body, a ball screw assembly that is correspondingly connected to the main body and the support leg, a power device that drives a screw to rotate, and a braking device that is disposed on the power device. The ball screw assembly includes a ball screw and a nut. The nut is fixedly connected to the support leg, the screw is fixedly connected to the main body through the support seat, the ball screw assembly converts a rotary motion of the screw into a linear motion of the nut, and the linear motion of the nut drives the support leg to move up and down relative to the main body, thereby embodying the jacking function. After jacking up, the power device stops working, and the braking force is generated on the shaft of the power device through the braking device, so that the jacking machine is maintained in the state after jacking up.

Due to a low rolling friction coefficient, the ball screw assembly has an advantage of high transmission efficiency, but the fatal weakness is that it cannot have the same self-locking function as a trapezoidal screw assembly during transmission, which makes the jacking machine using the ball screw assembly have the following technical defects: 1. It is easy to cause an accident if the object to be lifted falls. If the transmission chain between them fails, the screw will reverse and the object to be lifted will fall; and 2. The application field is limited. When applied to vehicles, since the support leg is in the retracted state at idle condition, the braking device on the power device is maintained in the retracted state. When the braking device fails, or a transmission chain between the power device and the screw assembly fails, the support leg will slide under its gravity, which will bring safety hazards to driving.

In view of this, the present disclosure proposes improvements.

SUMMARY OF THE DISCLOSURE

The main purpose of the present disclosure is to provide a jacking machine to solve the problem that the jacking machine that uses a ball screw assembly in the jacking state is prone to fall if an object is overloaded, a braking device fails, or a transmission chain fails, so as to improve reliability of the jacking machine.

The further object of the present disclosure is to solve the problem that when the jacking machine is applied to a vehicle, the support leg is prone to slide if the braking device fails or the transmission chain fails when it is unloaded, so as to improve a safety of the jacking machine when the jacking machine is applied to the vehicle.

In order to achieve the above-mentioned main purpose, a jacking machine provided by the present disclosure includes: a main body configured for connecting to an object to be lifted, wherein the main body includes a cylindrical structure; a support leg sleeved with the cylindrical structure of the main body and capable of moving up and down relative to the main body; a ball screw assembly, wherein the ball screw assembly includes a screw rod and a nut, the nut is fixedly connected to the support leg, the screw rod includes a support seat, and the support seat is fixedly connected to the main body; a power device configured for driving the screw rod to rotate; a braking device disposed on the power device; and a self-locking device, wherein the self-locking device includes: a chainring surrounding the screw rod and fixedly connected to the screw rod; a toothed claw corresponding to the chainring and rotatably connected to a side of the main body, wherein the toothed claw includes an engaged state and a disengaged state, when the toothed claw is in the engaged state, the toothed claw is located in a tooth slot on the chainring, and when the toothed claw is in the disengaged state, the toothed claw is outside the tooth slot on the chainring; a first elastic member configured for providing one force to the toothed claw to bring the toothed claw into the engaged state; and an electric actuator configured for providing another force to the toothed claw to bring the toothed claw into the disengaged state.

In addition to the braking device, the jacking machine further includes a self-locking device, so that in a jacking state, the jacking machine can be maintained in the jacking state through a dual function performed by the braking device and the self-locking device, thereby making high reliability. Combination: the self-locking device includes a chainring that surrounds the screw rod and is fixedly connected to the screw rod, and a toothed claw corresponding to the chainring and rotatably connected to the side of the main body; the toothed claw includes the engaged state and the disengaged state, the toothed claw is in the tooth slot on the chainring in the engaged state, and the toothed claw is outside the tooth slot on the chainring in the disengaged state; a first elastic member provides a force to the toothed claw to bring the toothed claw into the engaged state; and an electric actuator provides a force to the toothed claw so that the toothed claw enters the disengaged state, and the self-locking device can directly act on the screw rod. When the braking device and the transmission chain between the power device and the screw rod all fail, the self-locking device can still maintain the jacking machine in the jacking state.

Preferably, the electric actuator includes an energized state and a de-energized state, and when the electric actuator is in the energized state, the toothed claw is in the disengaged state, and when the electric actuator is in the de-energized state, the toothed claw is in the engaged state.

Preferably, the self-locking device further includes a manual actuator, and the manual actuator includes: a rocker arranged on an outer side of the main body and fixedly connected to a rotating shaft of the toothed claw; a plunger disposed on the rocker, wherein the plunger is capable of moving in a direction parallel to a centerline of rotation of the toothed claw; and a plunger hole corresponding to the disengaged state of the toothed claw and the plunger, and disposed on the side of the main body.

Preferably, the rocker is further provided with a locking mechanism configured for locking a position of the plunger.

In order to achieve the above-mentioned purpose, the jacking machine further includes: a fall prevention device, wherein the fall prevention device includes: a friction gasket surrounding the screw rod and fixedly connected to an upper end of the support seat of the screw rod; and a damping sleeve surrounding the screw rod and an end of the damping sleeve is in a friction fit with an upper end of the friction gasket, and the damping sleeve is fixedly connected to the screw rod.

After the above-mentioned anti-drop device is further installed, when the screw rod rotates due to the gravity of the support leg, the damping sleeve will rub against the friction washer, thereby generating a reverse resistance torque to prevent the screw rod from rotating, so as to achieve the effect of preventing the support leg from being rotated by the gravity. The specific structure of the above-mentioned anti-drop device enables the anti-drop device to directly act on the screw rod without being affected by the failure of the transmission chain between the screw rod and its power device. Moreover, it is completely embodied by a mechanical structure and will not be affected by power failure, thereby having better reliability and the advantages of simple structure and low cost.

Preferably, the fall prevention device further includes a second elastic member surrounding the screw rod and acting downward on the screw rod.

Preferably, the second elastic member includes: a spring gasket; and a pad cover, wherein the pad cover includes a central hole and a positioning groove surrounding the central hole, wherein the spring gasket is fixed in the positioning groove, and the central hole is slidingly fitted with an optical axis of the screw rod.

Preferably, a size configuration of the friction gasket is: $(D+d)/2 \geq FS*R/(2\pi*FS*\mu)$, wherein D is an outer diameter of the friction gasket, d is an inner diameter of the friction gasket, $\mu$ is a friction coefficient between the friction gasket and the damping sleeve, FS is a gravity of the support leg, and R is a lead of the ball screw assembly.

Preferably, the power device includes a speed reducer fixedly connected to the side of the main body and a motor; wherein a top end of the main body corresponding to the screw rod is rotatably connected to a transmission shaft, the transmission shaft is perpendicular to the screw rod, and the transmission shaft includes a power input end, a power output end and a first bevel gear, wherein the power input end is connected to a power output shaft of the speed reducer, and the power output end extends out of the main body; and wherein the screw rod is fixedly connected to a second bevel gear, and the second bevel gear is engaged with the first bevel gear.

A control method of the jacking machine includes the following steps: after receiving a jack-up command, controlling the braking device to leave a braking state, and controlling the power device and the electric actuator to switch the toothed claw of the self-locking device to the disengaged state; when the toothed claw is in the disengaged state, controlling the power device to drive a movement of the support leg relative to the main body; and after receiving a stop command or a feedback information of full stroke, controlling the braking device to enter the braking state, and controlling the electric actuator to release another force on the toothed claw, so that the toothed claw of the self-locking device switches to the engaged state.

Compared with the prior art, the present disclosure has at least the following beneficial effects.

In addition to the braking device, the jacking machine of the present disclosure also includes the self-locking device, so that in the jacking state, the jacking machine can be maintained in the jacking state through the dual function performed by the braking device and the self-locking device, thereby improving the reliability of the jacking machine. By virtue of "the self-locking device including the chainring that surrounds the screw rod and is fixedly connected to the screw rod; the toothed claw corresponding to the chainring and rotatably connected to the side of the main body; the toothed claw including the engaged state and the disengaged state, when the toothed claw is in the engaged state, the toothed claw is in the tooth slot on the chainring, and when the toothed claw is in the disengaged state, the toothed claw is outside the tooth slot on the chainring; the first elastic member providing the one force to the toothed claw to bring the toothed claw into the engaged state; and the electric actuator providing the another force to the toothed claw" the toothed claw enters the disengaged state, and the self-locking device can directly act on the screw rod. When the braking device and the transmission chain between the power device and the screw rod all fail, the self-locking device can still maintain the jacking machine in the jacking state.

After the above-mentioned fall prevention device is further installed, when the screw rod rotates due to the gravity of the support leg, the damping sleeve will rub against the friction gasket, thereby generating a reverse resistance torque to prevent the screw rod from rotating, so as to achieve the effect of preventing the support leg from being rotated by the gravity. The specific structure of the above-mentioned fall prevention device enables the fall prevention device to directly act on the screw rod without being affected by the failure of the transmission chain between the screw rod and its power device. Moreover, it is completely embodied by a mechanical structure and will not be affected by power failure, thereby having better reliability and the advantages of simple structure and low cost.

DETAILED DESCRIPTION OF THE EXEMPLARY EMBODIMENTS

Figure 1:
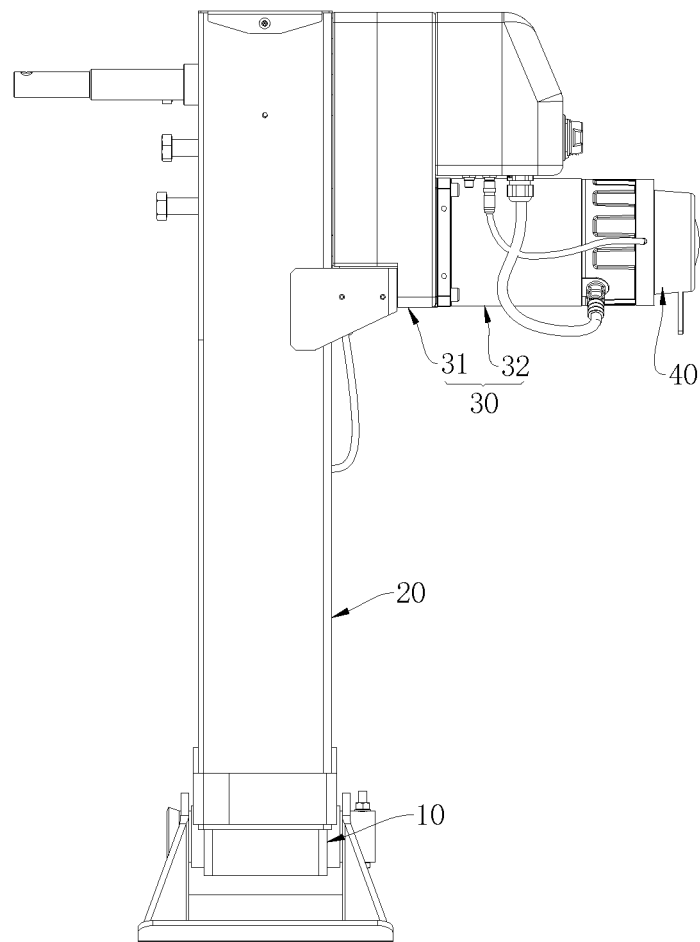
FIG. 1 is a schematic diagram of an external structure of a jacking machine according to an embodiment.
Figure 2:
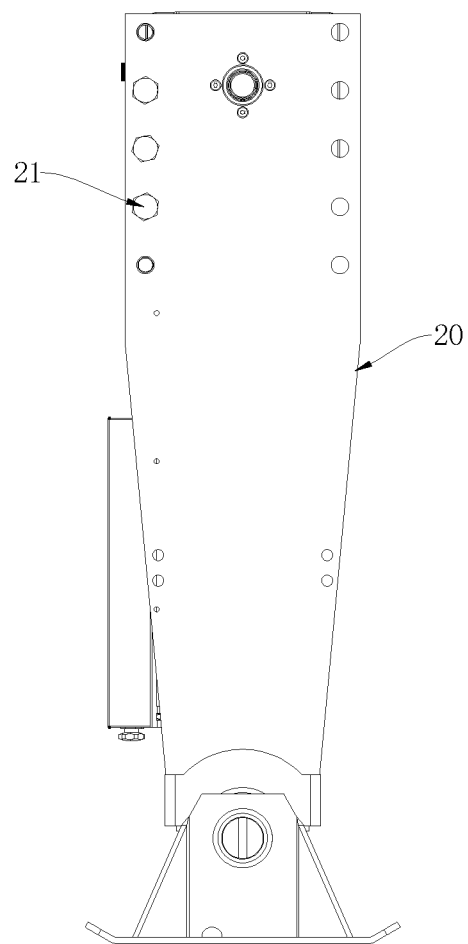
FIG. 2 is a schematic diagram of a side plate connected to a vehicle.
Figure 3:
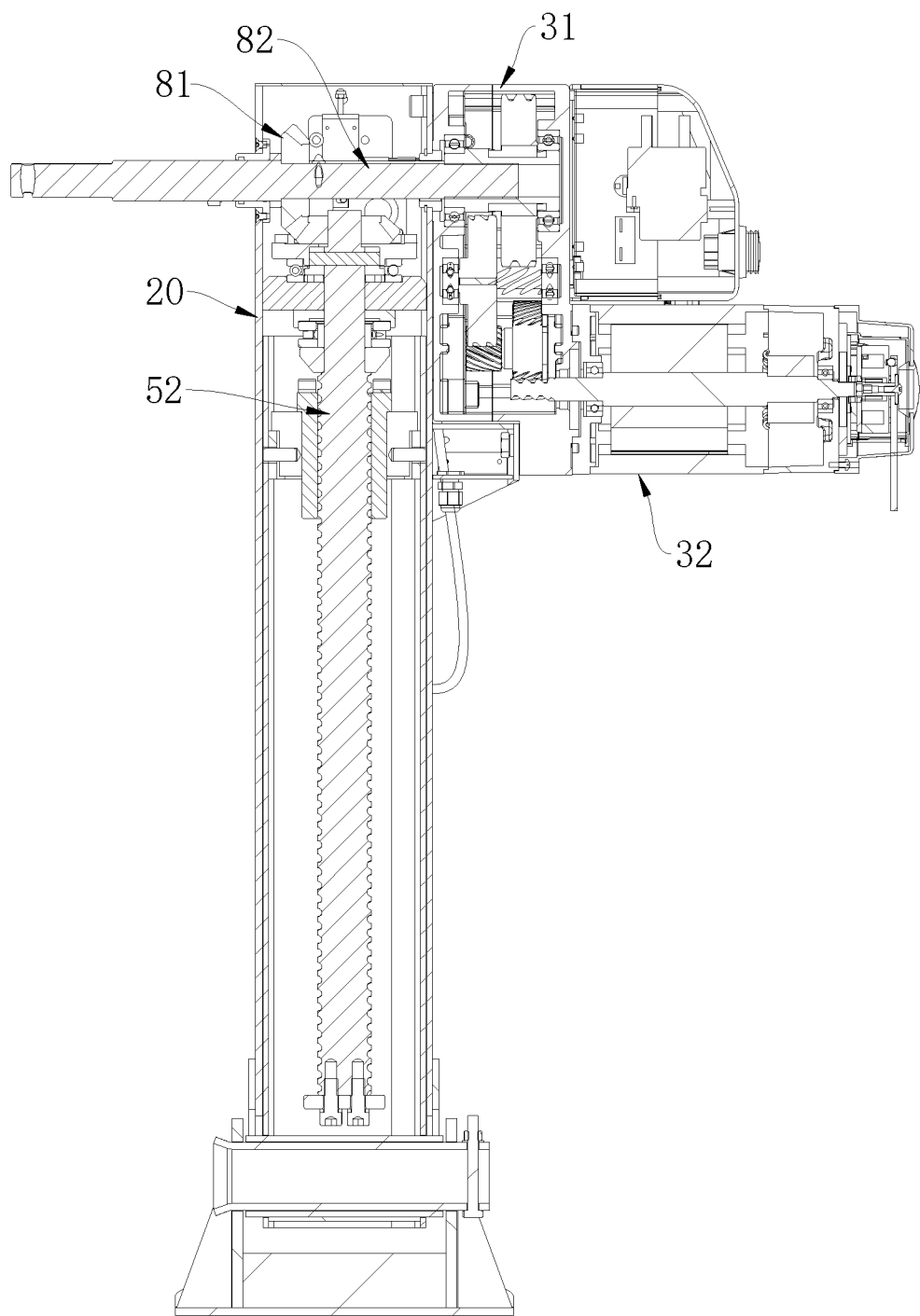
FIG. 3 is a schematic diagram of a transmission chain between a screw rod and a first motor.

The present disclosure will be further described below in conjunction with the accompanying drawings and embodiments.

Unless otherwise specified, terms such as first and second in this application are used to distinguish different components with the same name, and do not include meanings such as importance degree and sequence relationship.

Reference is made to FIG. 1 to FIG. 10, in which a jacking machine of the present embodiment includes: a support leg 10, a main body 20, a power device 30, a braking device 40, a ball screw assembly 50, a self-locking device 60, and a fall prevention device 70.

The main body 20 includes a cylindrical structure for accommodating the support leg 10 and fixing the electric jacking machine to an object to be lifted, such as a vehicle. In the present embodiment, the main body 20 specifically adopts a cylindrical structure of a square prism. A side surface of the square prism forms a mounting surface, and the side surface is provided with a connecting hole. During installation, the side surface is fitted with a mounting surface on the vehicle, and a locking is achieved by passing the bolt 21 through the connecting hole to embody the fixing of the jacking machine and the vehicle.

The support leg 10 is sleeved on the cylindrical structure of the main body 20 and can move up and down relative to the main body 20.

The ball screw assembly 50 includes a ball screw rod 52 and a nut 51. The nut 51 is fixedly connected to the support leg 10. The screw 52 includes a support seat 522, an upper thrust bearing 523 and a lower thrust bearing 521. The support seat 522 is welded with the main body 20, the upper thrust bearing 523 corresponds to an upper end of the support seat 522, and the lower thrust bearing 521 corresponds to a lower end of the support seat 522.

The power device 30 includes a speed reducer 31 and a first motor 32. The speed reducer 31 and the first motor 32 are correspondingly and fixedly arranged on one side of the main body 20 to provide power for the ball screw assembly 50. In the present embodiment, a transmission shaft 82 extending laterally is provided on an upper end of the main body 20, and the transmission shaft 82 is connected to a power output end of the speed reducer 31. The transmission shaft 82 and the screw rod 52 are connected to each other through a bevel gear pair 81. The bevel gear pair 81 includes a first bevel gear arranged on the transmission shaft 82 and a second bevel gear arranged on the screw rod 52. A power output by the first motor 32 is decelerated by the speed reducer 31 to drive the transmission shaft 82 to rotate, and a rotary motion of the transmission shaft 82 is transmitted to the screw rod 52 through the bevel gear pair 81 to provide the power to drive the screw rod 52 rotate.

The speed reducer 31, the transmission shaft 82 and the bevel gear pair 81 jointly form a transmission chain between the first motor 32 and the screw rod 52.

When the first motor 32 rotates forward, the support leg 10 moves upwards and is disengaged from the ground. When the first motor 32 reverses, the support leg 10 moves downwards to contact the ground to form a support, and then the vehicle is lifted upwards. Or the other way around.

The first motor 32 includes a power shaft, the power shaft includes a head end and a tail end, and the head end is connected to the speed reducer 31.

The braking device 40 is disposed at the tail end of the power shaft of the first motor 32 to brake the first motor 32. Optionally, the braking device 40 adopts an electromagnetic brake, and preferably for the electromagnetic brake when the power is off, the power shaft of the first motor 32 is braked, and when the power is on, the power shaft of the first motor 32 is released.

Figure 4:
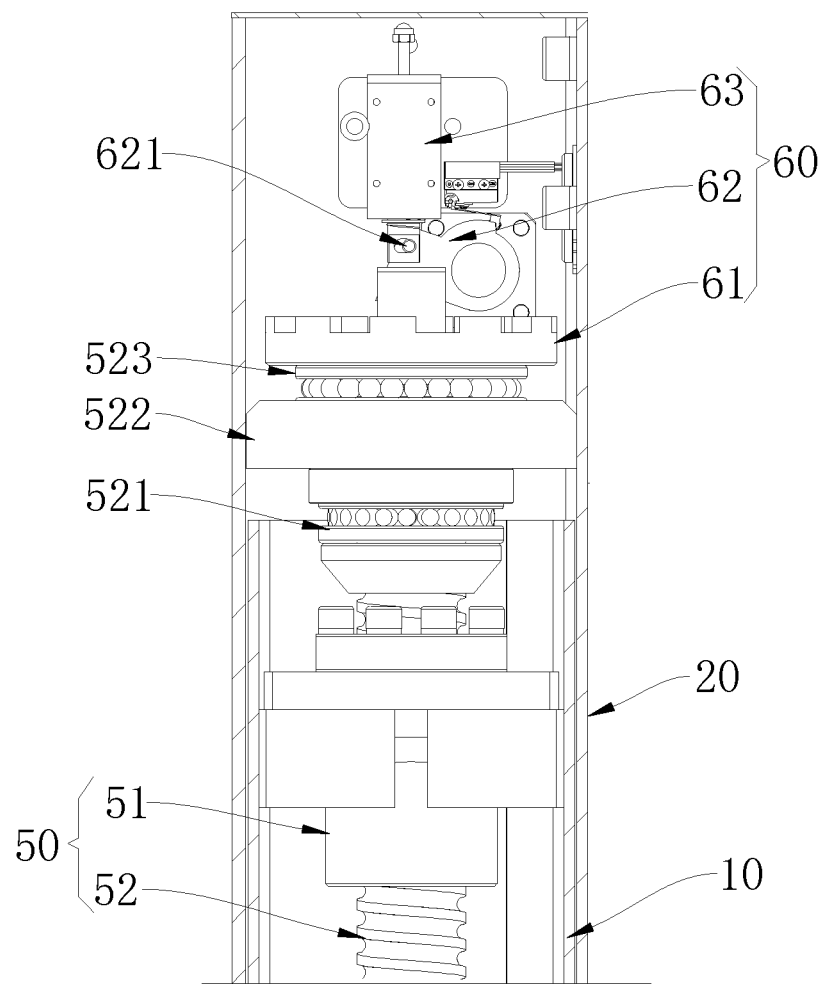
FIG. 4 is a schematic diagram of a combination of a self-locking device, a main body, and a screw rod assembly.
Figure 5:
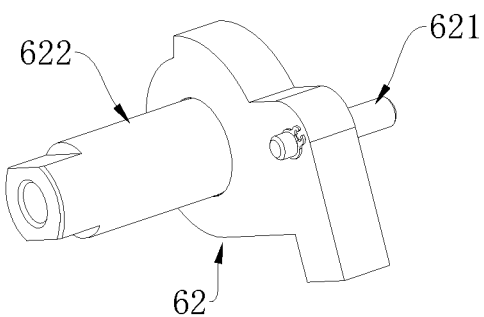
FIG. 5 is a schematic structural diagram of a toothed claw of the self-locking device.
Figure 6:
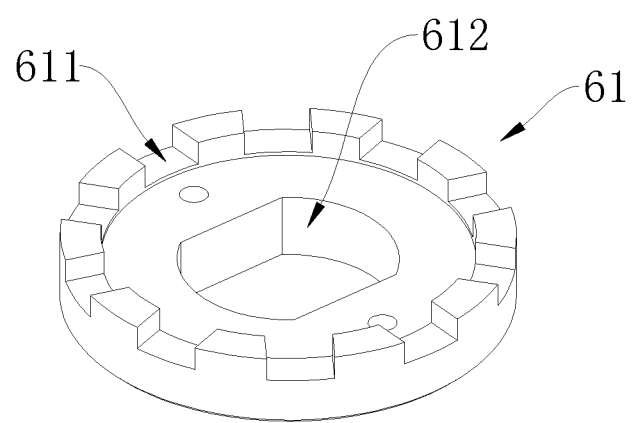
FIG. 6 is a schematic structural diagram of a chainring of the self-locking device.

Reference is made to FIG. 4 to FIG. 6, in which the self-locking device 60 includes a chainring 61, a toothed claw 62, a first elastic member, and an electric actuator 63.

The chainring 61 includes a first central hole 612 and a plurality of tooth slots 611 formed around the first central hole 612 on an upper end of the chainring 61. The first central hole 612 is fixedly connected to the screw rod 52.

The toothed claw 62 corresponds to the chainring 61, and the toothed claw 62 includes a connecting pin 621 and a rotating shaft 622. The toothed claw 62 is rotationally connected to the side of the main body 20 through the rotating shaft 622, and the connecting pin 621 is used for connecting to the electric actuator 63. The toothed claw 62 includes an engaged state and a disengaged state. In the engaged state, the toothed claw 62 is in the tooth slot 611 on the chainring 61, which limits the reverse rotation of the chainring 61 and the screw rod 52. In the disengaged state, the toothed claw 62 is outside the tooth slot 611 on the chainring 6, and does not hinder the rotation of the screw rod 52.

The first elastic member is used to provide a force to the toothed claw 62 to make the toothed claw 62 enter the engaged state. The first elastic member can be a torsion spring, the torsion spring is sleeved on the rotation shaft 622 of the toothed claw 62, such that two spring arms of the torsion spring are respectively connected to the toothed claw 62 and the main body 20 to provide the force. The first elastic member can also be a compression spring or a tension spring. One end of the compression spring or the tension spring is connected to the main body 20, and another end of the compression spring or the tension spring is connected to the toothed claw 62 at a position away from the rotating shaft 622 to provide the force.

The electric actuator 63 is used to drive the toothed claw 62 into the disengaged state. The electric actuator 63 specifically adopts a push rod electromagnet, and a body of the push rod electromagnet is fixed on the side of the main body 20 of the jacking machine. A push rod of the push rod electromagnet is connected to the connecting pin 621 of the toothed claw 62, and a pull-up movement of the push rod drives the toothed claw 62 into the disengaged state. The electric actuator 63 also can adopt a push rod motor. Preferably, the toothed claw 62 is in the disengaged state when the electric actuator 63 is powered on, and the toothed claw 62 is in the engaged state when the electric actuator 63 is de-energized, so as to obtain better reliability.

Since the jacking machine includes not only the braking device 40 but also the self-locking device 60, in the jacking up state, the jacking machine can be maintained in the jacking up state through a dual function performed by the braking device 40 and the self-locking device 60, thereby making higher reliability. By virtue of "the self-locking device 60 including the chainring 61 that surrounds the screw rod 52 and is fixedly connected to the screw rod 52, and the toothed claw 62 that corresponds to the chainring 61 and is rotatably connected to the side of the main body 20; the toothed claw 62 including the engaged state and the disengaged state, the toothed claw 62 being in the tooth slot on the chainring 61 in the engaged state, and the toothed claw 62 being outside the tooth slot on the chainring 61 in the disengaged state; the first elastic member providing the force to the toothed claw 62 to bring the toothed claw 62 into the engaged state; and the electric actuator 63 providing another force to the toothed claw 62," the toothed claw 62 enters the disengaged state, and the self-locking device 60 can directly act on the screw rod 52. When both the braking device 40 and the transmission chain between the power device 30 and the screw rod 52 fail, the self-locking device 60 can still maintain the jacking machine in the jacking state.

Figure 7:
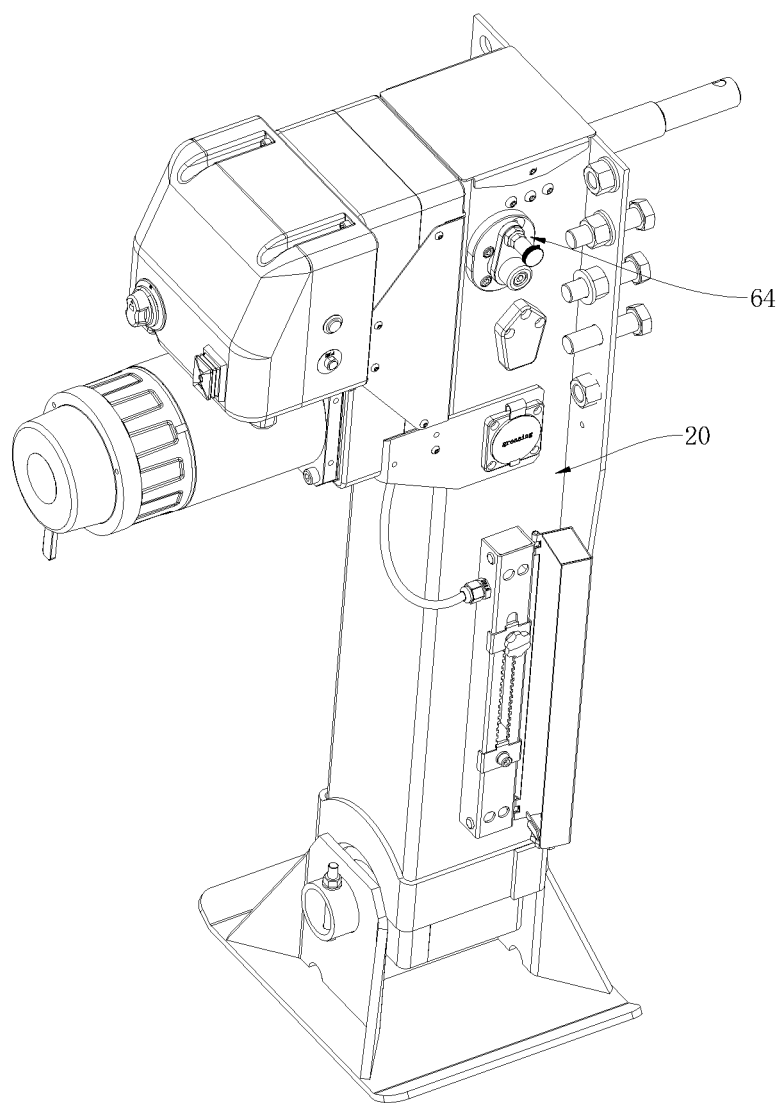
FIG. 7 is a schematic diagram of a position of a manual actuator on the main body.
Figure 8:
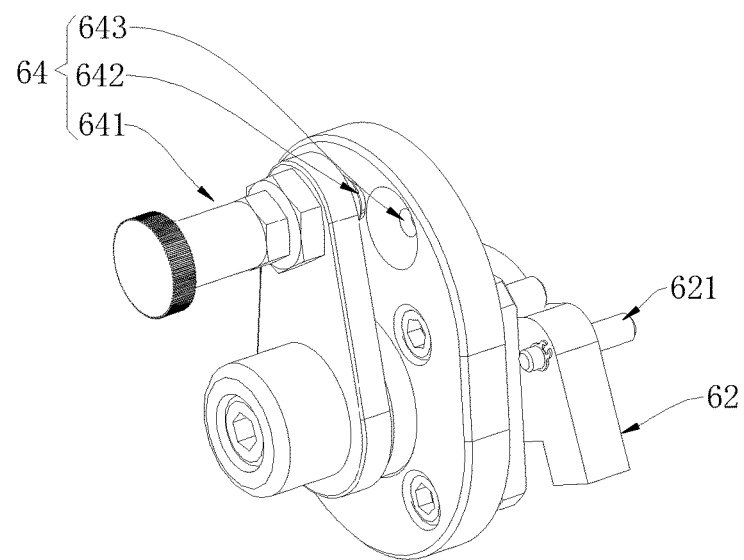
FIG. 8 is a schematic structural view of the manual actuator.
Figure 9:
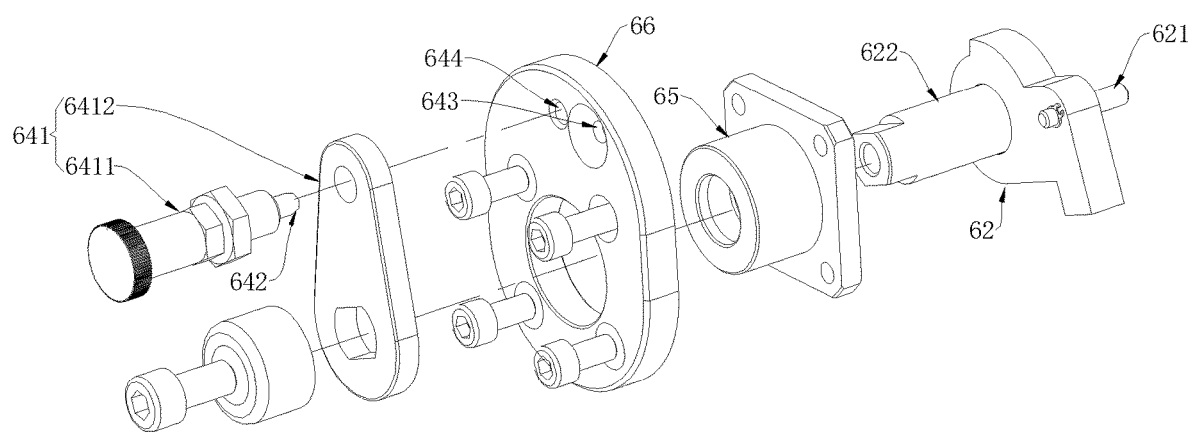
FIG. 9 is an exploded state diagram of FIG. 8.

Reference is made to FIG. 7 to FIG. 9, in which the self-locking device 60 further includes a manual actuator 64, and the manual actuator 64 is disposed on an outer side of the main body 20 corresponding to the toothed claw 62. The manual actuator 64 specifically includes a rocker 641, a plunger 642, a first plunger hole 643 and a second plunger hole 644. The rocker 641 is disposed on the outer side of the main body 20 and is fixedly connected to the rotating shaft 622 of the toothed claw 62. The plunger 642 is arranged on the rocker 641, and the first plunger hole 643 and the second plunger hole 644 are arranged on the side of the main body 20. The first plunger hole 643 and the second plunger hole 644 correspond to the plunger 642, and the plunger 642 can move along a direction parallel to a centerline of rotation of the toothed claw 62. In the present embodiment, the rocker 641 specifically includes a handle 6411 and a crank 6412. The rotating shaft 622 of the toothed claw 62 is fixedly connected to the crank 6412, the rotating shaft 622 is arranged on the shaft seat 65, the first plunger hole 643 and the second plunger hole 644 are correspondingly arranged on the outer cover plate 66, the shaft seat 65 and the outer cover plate 66 are arranged oppositely, the shaft seat 65 and the outer cover plate 66 are respectively located at an inner side and the outer side of the side of the main body 20, and the shaft seat 65 and the outer cover plate 66 are correspondingly and fixedly connected to the main body 20 by screws. Specifically, there are two plunger holes. The second plunger hole 644 corresponds to the disengaged state of the toothed claw 62, and the first plunger hole 643 corresponds to the engaged state of the toothed claw 62.

When the electric actuator 63 cannot be activated, the self-locking device 60 can be operated by the manual actuator 64. Specifically, the rocker 641 is turned clockwise, the rocker 641 drives the rotating shaft 622 to rotate, and the rotating shaft 622 drives the toothed claw 62 to rotate clockwise. When the toothed claw 62 enters the engaged state, the plunger 642 is aligned with the first plunger hole 643, the plunger 642 is pushed into the first plunger hole 643, and the first plunger hole 643 cooperates with the plunger 642 to maintain the toothed claw 62 in the engaged state. Likewise, the second plunger hole 644 corresponding to the disengaged state of the toothed claw 62 is used to cooperate with the plunger 642 to maintain the toothed claw 62 in the disengaged state.

Further, a locking mechanism is disposed on the rocker 641, and the locking mechanism is used to lock the position of the plunger 642, so that after the plunger 642 is inserted into the first plunger hole 643 or the second plunger hole 644, it will not come out from the plunger hole due to vibration or accidental impact. Specifically, threads can be provided on the plunger hole and the plunger, and the plunger can be locked in the plunger hole through the threads. Or the plunger can also be set as an elastic pin, the plunger can be locked in the plunger hole by the elastic force of the elastic pin, and the plunger can be pulled out from the plunger hole by applying an outward pulling force.

When the vehicle is running, the support leg 10 of the jack is in a retracted state, which is also a suspended state, and a state of the jack at this time is also called an unloaded state. In the unloaded state, the braking device 40 is in the braking state, and the power shaft of the motor is braked, thereby maintaining the support leg 10 in the retracted state. If the braking device 40 fails or the transmission chain between the screw rod 52 and the power device fails, the braking force will not be able to act on the screw assembly, and since the ball screw assembly does not have a self-locking function, under the action of the gravity of the support leg 10, the screw rod will reverse, and the support leg 10 will slide, causing a safety hazard to the vehicle. The defect can be solved by the fall prevention device 70.

Reference is made to FIG. 10 to FIG. 13, in which the fall prevention device 70 includes a friction gasket 73 and a damping sleeve 72.

Figure 10:
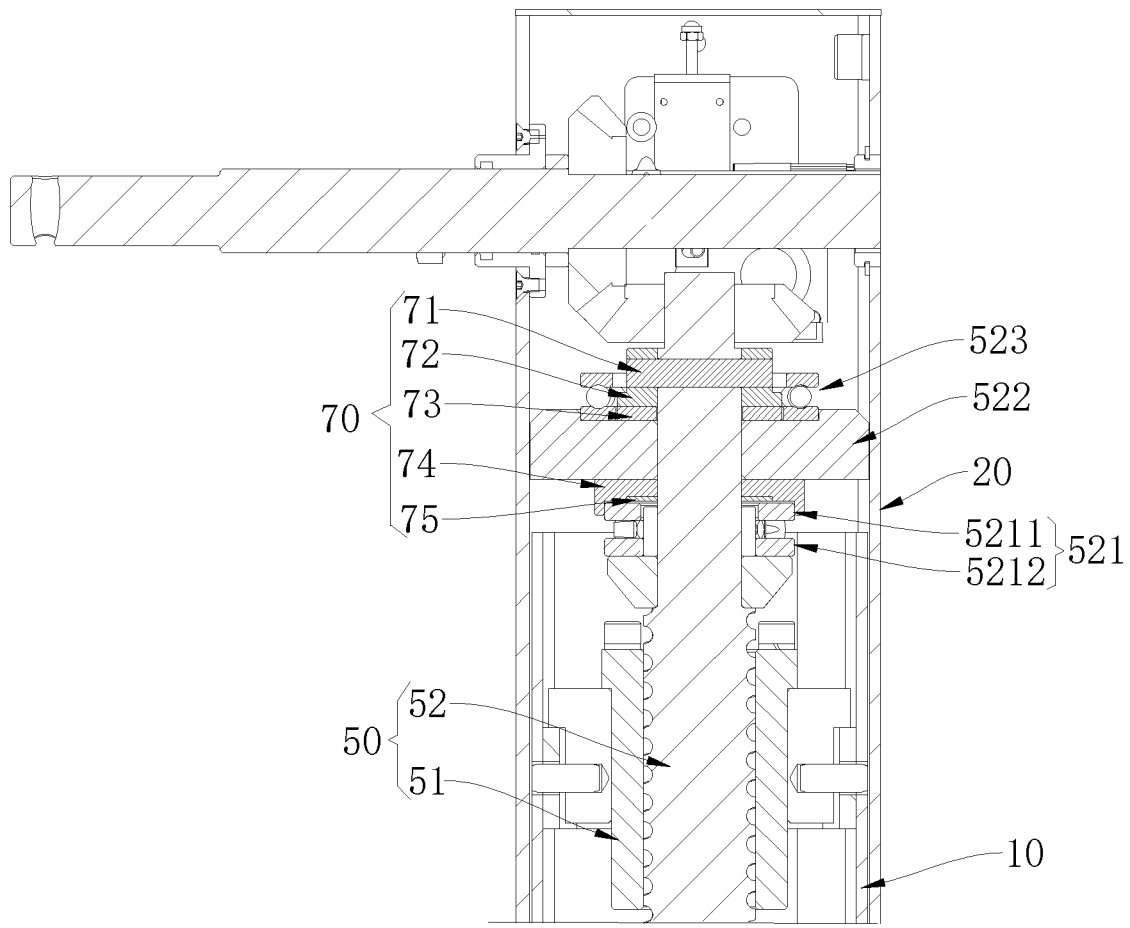
FIG. 10 is a schematic diagram of a combination of a fall prevention device and the screw assembly.
Figure 12:
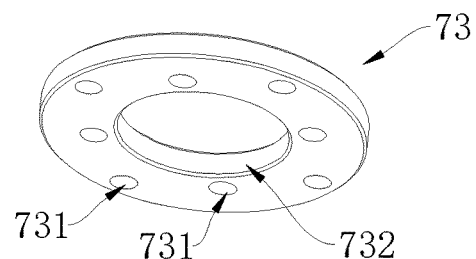
FIG. 12 is a schematic structural diagram of a friction gasket of the fall prevention device.

The friction gasket 73 surrounds the screw rod 52 and is fixedly connected to the upper end of the support base 522 of the screw rod 52. Reference is made to FIG. 12, in which the friction gasket 73 of the present embodiment specifically includes: a second central hole 732, and a plurality of first pin holes 731. All the first pin holes 731 are distributed around the second central hole 732. Reference is made to FIG. 10 and FIG. 12, in which the second central hole 732 is matched with an optical axis of the screw rod 52, and each of the first pin holes 731 is connected with the connecting pin at the upper end of the support base 522. The friction gasket 73 can also be fixedly connected to the support seat 522 in other ways, such as welding.

Figure 11:
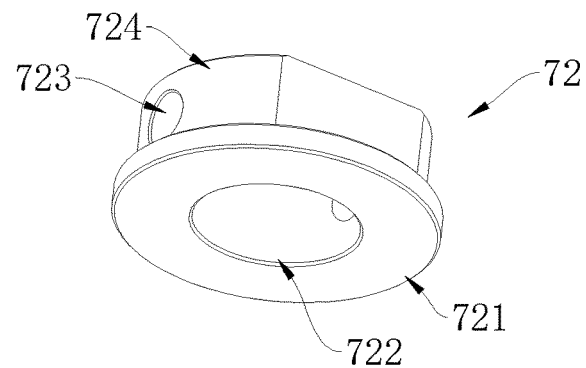
FIG. 11 is a schematic structural diagram of a damping sleeve of the fall prevention device.

The damping sleeve 72 surrounds the screw rod 52, and an end of the damping sleeve 72 is in friction fit with an upper end of the friction gasket 73, and the damping sleeve 72 is fixedly connected to the screw rod 52. Reference is made to FIG. 11, in which the damping sleeve 72 of the present embodiment specifically includes: a base plate 721 having a third central hole 722 and a cylindrical portion 724 extending from an edge of the third central hole 722 and perpendicular to the base plate 721. The cylindrical portion 724 is provided with a second pin hole 723. Reference is made to FIG. 10 and FIG. 11, in which the cylinder portion 724 is sleeved with the screw rod 52, and the second pin hole 723 is connected to a pin connection 71 on the screw rod 52, so that the damping sleeve 72 is fixedly connected to the screw rod 52, and a friction fit is formed between the base plate 721 and the friction gasket 73. The damping sleeve 72 can also be fixedly connected to the screw rod 52 in other ways, for example, welding. When welding is adopted, the damping sleeve 72 can be not provided with the cylinder portion 724 and the second pin hole 723.

After the above-mentioned fall prevention device 70 is installed, when the screw rod 52 rotates due to the gravity of the support leg 10, the damping sleeve 72 will rub against the friction gasket 73, thereby generating a reverse resistance torque and preventing the screw rod 52 from rotating, so as to achieve the effect of preventing the support leg 10 from falling due to gravity. The specific structure of the above-mentioned fall prevention device 70 enables the fall prevention device 70 to act directly on the screw rod 52 without being affected by the failure of the transmission chain between the screw rod 52 and the power device 30, and is completely embodied by the mechanical structure without being affected by the power failure, so that the advantages of better reliability, simple structure and low cost can be achieved.

The size of the friction gasket 73 and the damping sleeve 72 can be configured according to the following formula: $(D+d)/2 \geq FS*R/(2\pi*FS*\mu)$ where, D is an outer diameter of the friction gasket, d is an inner diameter of the friction gasket, $\mu$ is the coefficient of friction between the friction gasket and the damping sleeve, FS is the gravity of the support leg, and R is a lead of the screw assembly. In certain embodiments, the friction coefficient $\mu$ is in the interval [0.1-0.15], the friction gasket 73 is made of steel, and the damping sleeve 72 is made of tin bronze.

The fall prevention device 70 effectively solves the problem that when a jacking machine using a ball screw assembly is applied to a vehicle, if the braking device 40 fails or the transmission chain fails when it is in the unloaded state, the support leg 10 will slide down, which improves the safety when the jacking machine is applied to vehicles.

Affected by the ups and downs of the road conditions during the running of the vehicle, the friction gasket 73 and the damping sleeve 72 may be temporarily disengaged, and the support leg 10 may drop slightly. In order to further solve the problem, a second elastic member is further provided. The second elastic member generates downward elastic pressure on the damping sleeve 72, and uses the elastic pressure to preload the friction gasket 73 and the damping sleeve 72 to offset the upward pressure generated by the screw rod 52 on the damping sleeve 72 when the vehicle vibrates. The friction gasket 73 and the damping sleeve 72 are always combined seamlessly.

Reference is made to FIG. 10, in which the second elastic member of the present embodiment includes a spring gasket 75. Specifically, the lower thrust bearing 521 includes an upper seat ring 5211 and a lower seat ring 5212, and the spring gasket 75 is correspondingly press-fitted with the upper seat ring 5211 of the lower thrust bearing 521 and the lower end of the support seat 522 to form a downward elastic pressure on the screw rod 52, and the elastic pressure is transmitted to the damping sleeve 72 through the screw rod 52, so that the friction gasket 73 and the damping sleeve 72 are preloaded.

Figure 13:
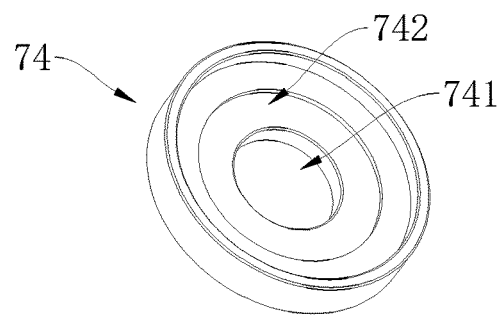
FIG. 13 is a schematic structural diagram of a pad cover of the spring gasket.

Further, the second elastic member also includes a pad cover 74. Reference is made to FIG. 10 and FIG. 13, in which the pad cover 74 includes a fourth central hole 741 and a positioning groove 742 surrounding the fourth central hole 741, and the spring gasket 75 is fixed in the positioning slot 742. The fourth central hole 741 is slidingly matched with the optical axis of the threaded rod 72. The gasket 74 can generate radial positioning for the spring gasket 75 to ensure the consistency of the pre-tightening force.

It should be pointed out that the second elastic member is not necessarily arranged on the lower side of the support seat 522, but can also be arranged on the upper side of the support seat 522. In addition, the second elastic member can directly act on the damping sleeve 72 or indirectly act on the damping sleeve 72. For example, the second elastic member can also be arranged on the upper side of the damping sleeve 72, and directly generate downward elastic pressure to the damping sleeve 72. Alternatively, the second elastic member can also be arranged on the upper side of the upper thrust bearing 523, and transmit the downward elastic pressure to the screw rod 52 through the upper thrust bearing 523, and then to the damping sleeve 72 through the screw rod 52.

The above-mentioned jacking machine includes the self-locking device 60. In the jacking up state, the dual function is performed by the braking device 40 and the self-locking device 60 to maintain the jacking up state of the jacking machine. The control method is as follows.

After receiving the jack-up instruction, the braking device 40 is controlled to leave the braking state, and the power device 30 and the electric actuator 63 are controlled to switch the toothed claw 62 of the self-locking device 60 to the disengaged state. The specific linkage method is that the power device 30 first drives the screw rod 52 to move for a certain period of time, so that the friction force between the toothed claw 62 and the chainring 61 is released, and then the electric actuator 63 drives the toothed claw 62 to move around the rotating shaft 622 to enter the disengaged state.

After the claw 62 enters the disengaged state, the power device 30 is controlled to drive the support leg 10 and the main body 20 to move relatively. Specifically, a sensor can be installed on one side of the toothed claw 62 to detect whether the toothed claw 62 enters the disengaged state.

After receiving the stop command or the feedback information that the stroke is in place, the braking device 40 is controlled to enter the braking state, and the electric actuator 63 is controlled to release the force on the toothed claw 62. The toothed claw 62 enters the engaged state or a waiting engaged state under the action of the first elastic member (the waiting engaged state means that the toothed claw 62 falls on the tooth top of the chainring 61, and in the state, as long as the chainring 61 rotates, the toothed claw 62 will fall into the tooth slot 611 of the chainring 61, and enter into the engaged state), so that the braking device 40 and the self-locking device 60 have dual functions, and the jacking state of the jacking machine is maintained.

The present disclosure has been described in detail through specific embodiments above. These detailed descriptions are only limited to help those skilled in the art understand the content of the present disclosure, and should not be construed as limiting the protection scope of the present disclosure. Various modifications and equivalent transformations made by those skilled in the art to the above solutions under the concept of the present disclosure shall be included in the protection scope of the present disclosure.

What is claimed is:

1. A jacking machine, comprising:
   a main body configured for connecting to an object to be lifted, wherein the main body includes a cylindrical structure;
   a support leg sleeved with the cylindrical structure of the main body and capable of moving up and down relative to the main body;
   a ball screw assembly, wherein the ball screw assembly includes a screw rod and a nut, the nut is fixedly connected to the support leg, the screw rod includes a support seat, and the support seat is fixedly connected to the main body;
   a power device configured for driving the screw rod to rotate;
   a braking device disposed on the power device; and
   a self-locking device, wherein the self-locking device includes:
      a chainring surrounding the screw rod and fixedly connected to the screw rod;
      a toothed claw corresponding to the chainring and rotatably connected to a side of the main body, wherein the toothed claw includes an engaged state and a disengaged state; wherein, when the toothed claw is in the engaged state, the toothed claw is located in a tooth slot on the chainring, and, when the toothed claw is in the disengaged state, the toothed claw is located outside the tooth slot on the chainring;
      a first elastic member configured for providing one force to the toothed claw so as to bring the toothed claw into the engaged state; and
      an electric actuator configured for providing another force to the toothed claw to bring the toothed claw into the disengaged state.

2. The jacking machine according to claim 1, wherein the electric actuator includes an energized state and a de-energized state; wherein, when the electric actuator is in the energized state, the toothed claw is in the disengaged state, and, when the electric actuator is in the de-energized state, the toothed claw is in the engaged state.

3. The jacking machine according to claim 1, wherein the self-locking device further includes a manual actuator, and the manual actuator includes:
- a rocker arranged on an outer side of the main body and fixedly connected to a rotating shaft of the toothed claw;
- a plunger disposed on the rocker, wherein the plunger is capable of moving in a direction parallel to a centerline of rotation of the toothed claw; and
- a plunger hole corresponding to the disengaged state of the toothed claw and the plunger,
and disposed on the side of the main body.

4. The jacking machine according to claim 3, wherein the rocker is further provided with a locking mechanism configured for locking a position of the plunger.

5. The jacking machine according to claim 1, further including:
- a fall prevention device, wherein the fall prevention device includes:
- a friction gasket surrounding the screw rod and fixedly connected to an upper end of the support seat of the screw rod; and
- a damping sleeve surrounding the screw rod, where an end of the damping sleeve is in a friction fit with an upper end of the friction gasket, and the damping sleeve is fixedly connected to the screw rod.

6. The jacking machine according to claim 5, wherein the fall prevention device further includes a second elastic member surrounding the screw rod and acting downward on the screw rod.

7. The jacking machine according to claim 6, wherein the second elastic member includes:
- a spring gasket; and
- a pad cover, wherein the pad cover has a central hole and a positioning groove surrounding the central hole, wherein the spring gasket is fixed in the positioning groove, and the central hole is slidingly fitted with an optical axis of the screw rod.

8. The jacking machine according to claim 5, wherein a size configuration of the friction gasket is: $(D+d)/2 \geq FS*R/(2\pi*FS*\mu)$, wherein D is an outer diameter of the friction gasket, d is an inner diameter of the friction gasket, $\mu$ is a friction coefficient between the friction gasket and the damping sleeve, FS is a gravity of the support leg, and R is a lead of the ball screw assembly.

9. The jacking machine according to claim 1, wherein the power device includes a speed reducer fixedly connected to the side of the main body and a motor;
wherein a top end of the main body corresponding to the screw rod is rotatably connected to a transmission shaft, the transmission shaft is perpendicular to the screw rod, and the transmission shaft includes a power input end, a power output end, and a first bevel gear; wherein the power input end is connected to a power output shaft of the speed reducer, and the power output end extends out of the main body;
wherein the screw rod is fixedly connected to a second bevel gear, and the second bevel gear is engaged with the first bevel gear.

10. A control method of a jacking machine, wherein the jacking machine is the jacking machine as claimed in claim 1, and the control method includes the following steps:
after receiving a jack-up command, controlling the braking device to leave a braking state, and controlling the power device and the electric actuator to switch the toothed claw of the self-locking device to the disengaged state;
when the toothed claw is in the disengaged state, controlling the power device to drive a movement of the support leg relative to the main body; and
after receiving a stop command or a feedback information of full stroke, controlling the braking device to enter the braking state, and controlling the electric actuator to release the another force on the toothed claw, so that the toothed claw of the self-locking device switches to the engaged state.

* * * * *